United States Patent [19]

Bucky

[11] 3,725,703
[45] Apr. 3, 1973

[54] X-RAY FILM CASSETTE

[76] Inventor: Peter A. Bucky, 30 East 81st Street, New York, N.Y.

[22] Filed: June 9, 1971

[21] Appl. No.: 151,306

[52] U.S. Cl. .................................. 250/65 R, 250/68
[51] Int. Cl. ............................................. G03b 41/16
[58] Field of Search ....................... 250/68, 66, 65 R

[56] References Cited

UNITED STATES PATENTS 3,294,610   12/1966   Kollock ................................. 250/68

Primary Examiner—James W. Lawrence
Assistant Examiner—C. E. Church
Attorney—Gottlieb, Rackman & Reisman

[57] ABSTRACT

A cassette for holding a plurality of X-ray film packs. The film packs are held in overlapping positions so that the edges of adjacent internal films are aligned to make up a large overall continuous area. Lead markings on the cassette cause mating symbols to be imaged on adjacent films; the final photographs can thus be pieced together easily to form the composite larger picture.

6 Claims, 6 Drawing Figures

PATENTED APR 3 1973 3,725,703

INVENTOR.
PETER A. BUCKY
BY
Gottlieb Rackman & Reisman
ATTORNEYS

X-RAY FILM CASSETTE

This invention relates to X-ray film cassettes, and more particularly to cassettes for containing a number of separate X-ray film packs to allow a large X-ray picture to be made from a number of X-ray films each of relatively small size.

It is often desirable to use a single X-ray apparatus for exposing film by X-rays transmitted through objects of different sizes. For example, bomb disposal squads in many cities have available portable X-ray generators which are carried to the site of a suspected bomb. A suitcase under suspicion can be placed between the X-ray generator and an X-ray plate, the plate being exposed to the X-rays transmitted through the suitcase. For rapid determination of the existence of a bomb in the suitcase, it is necessary to quickly develop the film. For this reason film packs marketed by the Polaroid Corporation are often used. In such a pack, film is contained in a paper package. While light cannot penetrate through the paper, X-rays can, and for this reason it is not even necessary to strip the paper from the film prior to exposure. The Polaroid Land film pack can be developed automatically in less than a minute as is known to those skilled in the art. (Although the invention is described with reference to Polaroid Land film packs, it is to be understood that the invention is applicable to any type of film or film pack which can be exposed by X-rays.)

Since there are many different size suitcases, if a large size film is always used in a particular apparatus, in the case of a small suitcase much of the film is "wasted." It is therefore apparent that considerable economies can be realized if the total film area corresponds to the size of a particular suitcase under suspicion.

In the case of Polaroid film packs, the ratio of the cost of a large (8 inches × 10 inches) pack to the cost of a small (4 inches× 5 inches) pack is greater than the ratio of the areas. In other words, while the combined areas of four small films equals that of a single larger film, the cost of four small film packs is considerably less than the cost of one larger film pack. It is therefore apparent that the cost of taking X-ray pictures of relatively large objects increases disproportionately with the object size.

It is a general object of my invention to provide an X-ray film cassette which does not result in the inefficient waste of film area when X-ray pictures are taken of objects of different sizes, and which allows X-ray pictures to be taken of objects of all sizes at the minimum possible cost.

Briefly, in accordance with the principles of my invention, an X-ray film cassette is provided into which a number of small-size film packs can be inserted. The film packs are maintained in positions adjacent to each other so that several films can be arranged to form a total film area of a size commensurate with the size of the object to be photographed. Since the overall film area in each case is built up from individual films of small areas, it is apparent that the overall film area can be controlled in accordance with the size of the object to be photographed, and that in all cases, since the cheapest possible film packs (on a per unit area basis) can be used, great economies can be achieved. (Even greater economies result in the case of Polaroid Land film packs because the processing equipment which must be purchased for developing large film packs is much more expensive than the processing equipment which must be purchased to develop small film packs.)

There are two problems, however, which are encountered when it is attempted to use a number of relatively small-size film packs in this manner. The first problem relates to the fact that each film is completely enclosed in a paper package. If the packages are placed in the cassette with the edges of adjacent packs touching each other, since the film area in each pack does not extend all the way to the edges of the pack, it is apparent that in the final composite picture there will be gaps between all adjacent edges of the individual photographs. The second problem concerns the arrangement of the several photographs. If many small-size film packs are used in a particular instance, after each of them is developed individually, the resulting photographs must be arranged in the same pattern in which the individual film packs were arranged when they were exposed. In effect, it is necessary for the user of the equipment to put together the pieces of a "puzzle" in order to realize the final picture.

For this reason, I provide an X-ray film cassette having properties which solve both of these problems. The cassette is arranged so that adjacent film packs overlap each other. While adjacent film packs overlap each other, the overlapping is to an extent which lines up the edges of films in adjacent packs. Since the X-rays penetrate the paper covers, the fact that one film pack has its paper cover over a portion of the film area in another film pack does not in any way inhibit exposure of the film which is thus "blocked." (In a typical Polaroid Land film pack, the pack includes a thin metal edge. But since X-rays can penetrate through this metal edge, the overlapping presents no problem.)

The cassette includes small markings which block X-rays. In the illustrative embodiment of the invention, these markings are made of ink containing lead in it. The markings are lined up with the edges of adjacent films within the cassette, and a portion of each marking is arranged to lie over each of the two films at the common edge. Each of the markings is different from the others. The developed films contain the small markings and they greatly simplify the putting together of the "puzzle." It is only necessary to take pairs of photographs with paired markings and to arrange them so that the markings are next to each other. In this way, the entire picture can constructed quite rapidly.

It is a feature of my invention to provide an X-ray film cassette which positions individual X-ray film packs in such a way that their edges overlap but with the edges of adjacent films being aligned.

It is another feature of my invention to provide markings on the cassette which block X-rays and thus appear in the developed pictures, which markings can be matched together so that the individual photographs can be put together easily in the proper order to form the overall picture.

Further objects, features and advantages of my invention will become apparent upon consideration of the following detailed description in conjunction with the drawing, in which.

Figure 1:
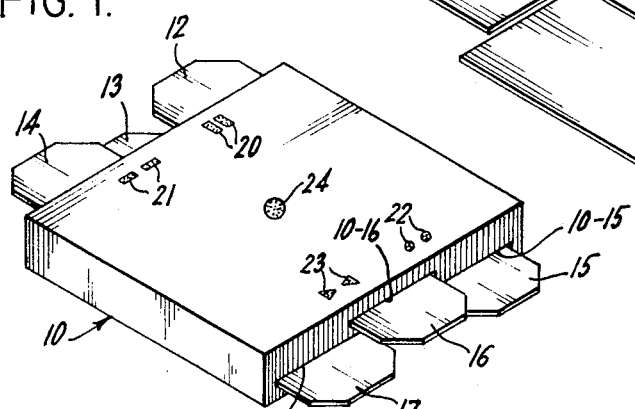
FIG. 1 depicts an illustrative X-ray film cassette in accordance with the principles of my invention, and further shows six film packs contained within the cassette.

Referring to FIG. 1, cassette 10 contains six slots 10-12 through 10-17 for insertion therein of film packs 12 through 17. Although the illustrative cassette holds a maximum of only six packs, larger cassettes can be constructed along the same lines. On top of the cassettes are five different lead markings 20 through 24. In taking an X-ray picture of a suitcase, for example, the cassette would be placed in a vertical orientation with the markings 20 through 24 facing the object. In this way, the X-rays which are transmitted through the object pass through the cassette except where they are blocked by the lead markings. The cassette itself can be made of any material which is transparent to X-rays, such as plastic.

Figure 2:
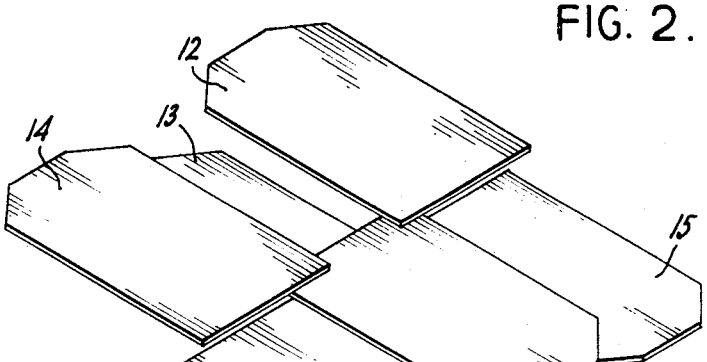
FIG. 2 shows the arrangement of the individual film packs within the cassette of FIG. 1.
Figure 6:
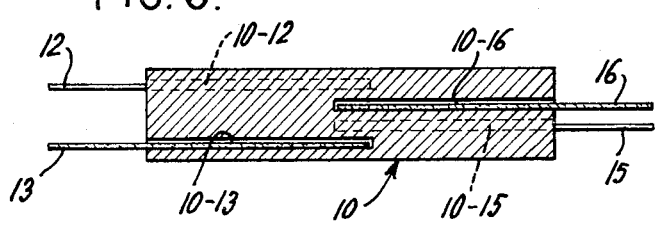
FIG. 6 is a sectional view through the line 6—6 of FIG. 4.

FIG. 2 shows the manner in which the six film packs overlap each other. The film packs are contained in four different planes, as is also evidenced from an inspection of FIGS. 5 and 6. Film pack 13 is in the lowest level, film packs 15 and 17 are above it, film pack 16 is in the next to highest level, and the highest level contains film packs 12 and 14. The spacing between the various film packs in the vertical direction in the drawing is exaggerated for the sake of clarity. It is apparent that the slots for containing the individual film packs can be one on top of the other so that a very compact sandwich of film packs can be achieved.

Figure 3:
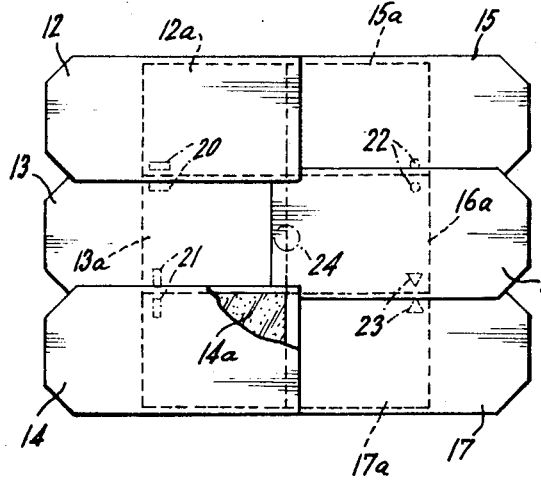
FIG. 3 shows the manner in which the film edges within the six film packs are aligned within the cassette.
Figure 4:
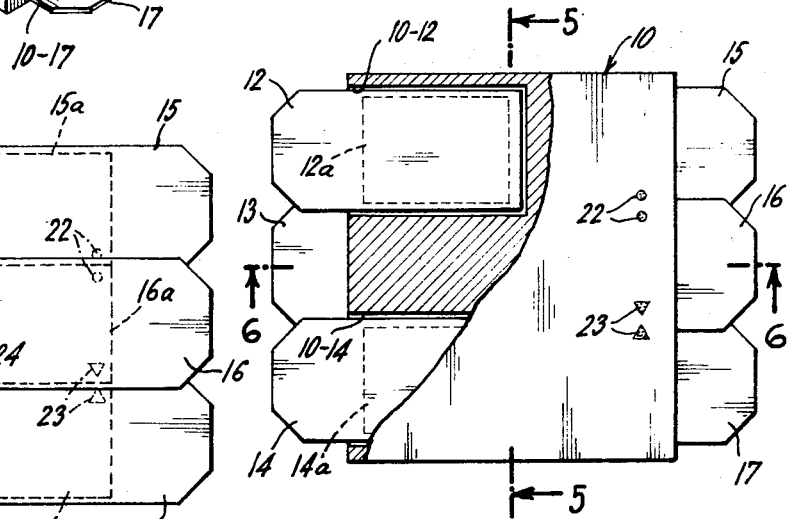
FIG. 4 is a top view of the cassette of FIG. 1, shown partially broken away.

FIG. 3 shows the manner in which the films 12a through 17a within the film packs 12 through 17 are aligned within the cassette. Although the film area within each pack does not extend outward to any edge of the pack, within the cassette the edges of adjacent films are aligned with each other. The film areas 12a through 17a together comprise a large film area whose size is six times the size of any individual film area.

FIG. 3 also shows the positions of the markings 20 through 24 relative to the films within the individual packs. It will be seen that the five markings in FIG. 1 are of different shapes. Four of the markings (20 through 23) consist of pairs of symbols, while one of the markings (24) is a single continuous symbol (which is also a pair of markings — two semi-circles). It is apparent that each marking overlies aligned edges of adjacent films. The markings block X-rays and thus images of them appear on the developed films.

In piecing together the individual final photographs it is only necessary to line up each marking with its mate. For example, the two photographs with small circles (22) can first be placed adjacent to each other. One of these photographs (16a) also contains a small triangle 23 and a semi-circle 24. This immediately enables photographs 13a and 17a, each of which contains a mating symbol, to be placed in their proper positions.

Since photograph 13a contains two differently orientated rectangles 20 and 21, photographs 12a and 14a can both be quickly placed in their proper positions. Additional markings could be provided on the cassette for imaging at the aligned edges of films 12a and 15a, and 14a and 17a. However, even without these markings the composite picture can be put together very rapidly. Nor is it necessary to use pairs of identical markings such as 20 through 23, or single symbols such as 24. Any type of symbols can be used which facilitate matching of adjacent photographs. For example, numerals or letters can be used.

Figure 5:
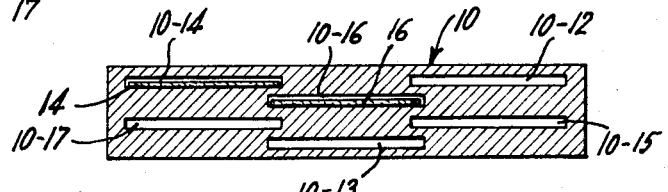
FIG. 5 is a sectional view through the line 5—5 of FIG. 4 with only two film packs contained within the cassette.

The sectional view of FIG. 5 shows only two film packs 14 and 16 within respective slots 10-14 and 10-16. The figure is designed to show that if a relatively small size object is to be photographed, less than six film packs can be used.

In the event a larger cassette is desired, additional slots can be provided along the sides of cassette 10 in FIG. 1. However, this would only allow the resulting overall film area to be increased in the vertical direction of FIG. 3. In order to allow the area to be increased in the horizontal direction of FIG. 3, it is necessary to provide a cassette which allows several levels of film packs to be overlapped along their long dimensions. (Although a Polaroid film pack contains a developer solution at the end of the pack with the angled corners, since the developer solution is transparent to X-rays it is possible to overlap the packs even though the developer solution of one pack overlies the film area of another.) Where provision must be made for overlapping several levels of film packs in the horizontal direction of FIG. 3, it is difficult to utilize a cassette of the type shown in the drawing because it would be necessary to place a film pack in the middle of the cassette. In the cassette of the drawing, each pack is simply pushed all the way into its respective slot, the ends of the slot being such that when all of the packs are fully pushed in the film areas abut each other. Were slots to be provided for holding one or more middle levels of film packs, it would be difficult to insure that the middle levels were properly placed. For this reason, in those cases where the overall film area must be increased in the horizontal direction of FIG. 3, it is preferable to use a cassette which comprises two plates hinged to each other. A base plate might include internal guides for properly orienting the film packs. The other plate, which would function as a cover, would include the inked markings on one of its surfaces. After the film packs are inserted onto the base plate, the cover plate would be closed and the cassette could then be used.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What I claim is:

1. An X-ray film cassette comprising means for positioning individual X-ray film packs therein with the edges in overlapping relationships such that the films within the film packs are lined up relative to each other to form a continuous large film area substantially equal to the sum of the areas of the individual film packs, the cassette being transparent to X-rays in the direction in which X-rays are directed toward said films and including paired markings which block X-rays such that paired markings are exposed on pairs of continguous films within the cassette.

2. An X-ray film cassette in accordance with claim 1 wherein all of the markings which are imaged on different pairs of continguous films are different from each other.

3. An X-ray film cassette in accordance with claim 2 wherein within the cassette said film packs are maintained in at least four different planes.

4. An X-ray film cassette in accordance with claim 1 wherein within the cassette said film packs are maintained in at least four different planes.

5. An X-ray film cassette in accordance with claim 4 wherein said positioning means positions said film packs such that the edges of films in adjacent film packs are aligned with each other and said markings are imaged along the edges of pairs of contiguous films.

6. An X-ray film cassette in accordance with claim 2 wherein said positioning means positions said film packs such that the edges of films in adjacent film packs are aligned with each other and said markings are imaged along the edges of pairs of contiguous films.

* * * * *